(12) United States Patent
Fuller et al.

(10) Patent No.: US 11,568,450 B2
(45) Date of Patent: Jan. 31, 2023

(54) REWARD SYSTEM FOR MICRO INFLUENCERS IN A SOCIAL MEDIA MARKETING CAMPAIGN

(71) Applicant: SPACO LLC, Fairfield, CT (US)

(72) Inventors: Brian Neil Fuller, Shelton, CT (US); Daniel Barnaby Gross, Shelton, CT (US); Paul Zullo, Norwalk, CT (US); James M. Valentine, Fairfield, CT (US)

(73) Assignee: SPACO LLC, Fairfield, CT (US)

( * ) Notice: Subject to any disclaimer, the term of this patent is extended or adjusted under 35 U.S.C. 154(b) by 138 days.

(21) Appl. No.: 16/059,435

(22) Filed: Aug. 9, 2018

(65) Prior Publication Data
US 2019/0050911 A1 Feb. 14, 2019

Related U.S. Application Data

(60) Provisional application No. 62/543,166, filed on Aug. 9, 2017.

(51) Int. Cl.
*G06Q 30/00* (2012.01)
*G06Q 30/02* (2012.01)
*G06Q 50/00* (2012.01)

(52) U.S. Cl.
CPC ..... *G06Q 30/0273* (2013.01); *G06Q 30/0244* (2013.01); *G06Q 30/0261* (2013.01); *G06Q 50/01* (2013.01)

(58) Field of Classification Search
CPC ............ G06Q 30/02–0277; G06Q 50/01
See application file for complete search history.

(56) References Cited

U.S. PATENT DOCUMENTS

| 8,768,751 B2 | 7/2014 | Jakowski et al. |
| 9,059,950 B2 | 6/2015 | Greenzeiger et al. |

(Continued)

FOREIGN PATENT DOCUMENTS

| KR | 1698492 B1 * 11/2015 | ............. G06F 17/00 |

OTHER PUBLICATIONS

"The Power of Geofencing and How to Add it to Your Marketing"; retrieved Feb. 20, 2019 from: https://www.salesforce.com/products/marketing-cloud/best-practices/geofencing-marketing/?mc=marketingcloud.com/geofencing-marketing.

(Continued)

*Primary Examiner* — Raquel Alvarez
(74) *Attorney, Agent, or Firm* — Forge IP, PLLC

(57) ABSTRACT

A business accesses a campaign server and inputs information relevant to a marketing campaign. The server sends invitations to social media influencers, who then post content to various platforms to influence customers to act in ways beneficial to the business, either by further advancing the marketing campaign or by actually generating revenue for the sponsor. The system tracks the social media reactions of customers (likes, shares, etc.), as well as real-world activity (product purchases, physical attendance at advertised locations, etc.), attributable to each influencer, and points are awarded based on the activity they generate among customers. The points are weighted according to the type of activity generated and/or the social media platforms on which the activity is generated, and the running point totals of the influencers are published to foster competition among them. A total reward is allocated and paid to the influencers according to their relative total accumulated points.

30 Claims, 6 Drawing Sheets

(56) References Cited

U.S. PATENT DOCUMENTS

| | | | |
|---|---|---|---|
| 9,396,483 B2 | 7/2016 | Hamedi | |
| 9,632,972 B1 | 4/2017 | Moxley et al. | |
| 9,641,619 B2 | 5/2017 | Brophy | |
| 9,886,716 B2 | 2/2018 | Salvatore | |
| 2008/0051201 A1* | 2/2008 | Lore | A63F 13/12 463/42 |
| 2009/0037257 A1 | 2/2009 | Stuckey et al. | |
| 2012/0209674 A1 | 8/2012 | Neystadt et al. | |
| 2013/0073378 A1 | 3/2013 | Naveh et al. | |
| 2013/0085838 A1 | 4/2013 | Tennenholtz et al. | |
| 2013/0325587 A1 | 12/2013 | Kothari et al. | |
| 2014/0081753 A1 | 3/2014 | Mesaros | |
| 2014/0081879 A1* | 3/2014 | Olson | G06Q 30/0208 705/319 |
| 2014/0081880 A1* | 3/2014 | Estes, Jr | G06Q 30/0241 705/319 |
| 2015/0066615 A1 | 3/2015 | Gandhi et al. | |
| 2015/0302478 A1 | 10/2015 | Michael | |
| 2016/0019579 A1 | 1/2016 | Sims et al. | |
| 2017/0154359 A1 | 6/2017 | Zukerman | |
| 2017/0249388 A1 | 8/2017 | Alonso et al. | |
| 2017/0249656 A1 | 8/2017 | Gantner et al. | |
| 2018/0047114 A1 | 2/2018 | Haaland | |
| 2018/0150870 A1 | 5/2018 | Haaland | |
| 2018/0158089 A1 | 6/2018 | Tort | |
| 2019/0102808 A1* | 4/2019 | Levy | G06Q 30/0267 |

OTHER PUBLICATIONS

Bill Arnold, "Influencer Marketing Pad 1—Who are influencers?", Mar. 28, 2018, Retrieved from: https://www.prevail.marketing/blog/influencer-marketing-part-1.

Mavin, "Why Nano Influencers are the Future of Influence Marketing", Nov. 13, 2017, Retrieved from: https//medium.com/@mavin.network/why-nano-influencers-are-the-future-of-influence-marketing-369cada5cb9f.

Cori Uddenberg, "Marketing with Micro-Influencers: 3 Ways to Drive Engagement", Jul. 19, 2017, Retrieved from: https://screenpilot.com/2017/07/marketing-micro-influencers-3-ways-drive-engagement/.

VanToai, "How to motivate and reward micro-influencers", Jan. 28, 2017, Retrieved from: https://www.crewfire.com/reward-micro-influencers/.

Salcu, Adrian Vicentiu, et al, "Gamification Applied in Affiliate Marketing. Case Study of 2PARALE", Dec. 30, 2013, Management & Marketing 8.4: 767-790. De Gruyter Open Sp. z o.o. (2013) Retrieved from: https://dialog.proquest.com/professional/docview/1503088642/fulltext/1639937D868363E0377/7?accountid=157282.

Barrett Wissman, "Micro-Influencers: The Marketing Force Of The Future?", Mar. 2, 2018, Retrieved from: https://www.forbes.com/sites/barrettwissman/2018/03/02/micro-influencers-the-marketing-force-of-the-future/#3067f3ef6707.

* cited by examiner

| | Network Weighting | Customer Social Media Reaction | Points | Weighted Point Value | | Customer Real-World Action | Points |
|---|---|---|---|---|---|---|---|
| Social Media Platform A | 50% | Like | 5 | 2.5 | | Physical Visit | 100 |
| | | Comment | 10 | 5.0 | | Online Purchase | 100 |
| | | Share | 20 | 10.0 | | | |
| Social Media Platform B | 30% | Like | 5 | 1.5 | | Call | 50 |
| | | Comment | 10 | 3.0 | | Reservation | 50 |
| | | Share | 20 | 6.0 | | | |
| | | Other | 25 | 7.5 | | Donation | 0 |
| Social Media Platform C | 10% | Like | 5 | 0.5 | | Other | 0 |
| | | Comment | 10 | 1.0 | | | |
| | | Share | 20 | 2.0 | | | |
| Social Media Platform D | 10% | Like | 5 | 0.5 | | | |
| | | Comment | 10 | 1.0 | | | |
| | | Share | 20 | 2.0 | | | |
| | | Other | | | | | |

| | Total Weighted Social Media Points* | Award Points with SM Reaction Weighting of 40% | Action Points | Award Points With RW Action Weighting of 60% | Total Award Points | % of Award Pool |
|---|---|---|---|---|---|---|
| Influencer 1 | 1250 | 500 | 300 (3 visits) | 180 | 680 | 48.6% |
| Influencer 2 | 500 | 200 | 200 (2 visits) | 120 | 320 | 22.9% |
| Influencer 3 | 250 | 100 | 500 (5 visits) | 300 | 400 | 28.5% |
| | 2000 | 800 | 1000 | 600 | 1400 | 100% |

* Number of reactions X weighted point value

FIG. 4

REWARD SYSTEM FOR MICRO INFLUENCERS IN A SOCIAL MEDIA MARKETING CAMPAIGN

FIELD OF THE INVENTION

The present invention relates to a system for conducting a social media marketing campaign. More specifically, the invention relates to a system for gamifying and rewarding the effective posting of local micro-influencers by tracking the amount of engagement by end users (customers) that is generated by each participating influencer's social media posts, and providing those influencers with a reward corresponding to their relative influence.

BACKGROUND OF THE INVENTION

The use of social media for advertising and promotion has grown rapidly with the advent of smartphones and various platforms such as Facebook, Twitter, Instagram, and Snapchat. New social media platforms continue to emerge, and this medium will continue to be exploited by businesses of all types as an effective way to advertise and market their locations, events, and goods.

Most advertising programs attempt to maximize exposure by using viral marketing techniques. Brand ambassadors can make significant amounts of money by using their network of social media contacts to promote a brand or product on a macro basis. These macro-influencers typically have a social media following of over 100,000 followers, and some celebrity influencers have networks of millions of followers. Fees paid to these influencers can range from thousands of dollars to hundreds of thousands of dollars for a given promotional campaign.

However, this high cost generally puts the use of social media campaigns out of the reach of many small businesses. Additionally, this type of employment of macro-influencers is not the most effective way of using social media for a local or regional business, since many social media contacts in a macro campaign are outside of a local geographic area, and thus, are not likely to be realistic business prospects.

Further, posts by the business itself on social media sites like Facebook or Instagram are not likely to generate new traffic beyond the sometimes limited number of followers regularly visiting its site.

Thus, there exists a need for a low-cost approach that allows small, local businesses to use social media to grow awareness of their business in the local community, attract new customers, and increase revenues.

SUMMARY OF THE INVENTION

Accordingly, one object of the present invention is to provide a system using social media as a marketing vehicle that exploits the potential influence of micro-influencers. Micro-influencers in this case will typically have a range of followers between 1,000 and 10,000, although that number can be larger or smaller, but regardless of the number, the followers of any micro-influencer will generally have a level of personal engagement beyond that of a macro-influencer or celebrity influencer.

It is another object of the present invention to provide such a system that promotes gamification of social media influencing as an additional motivating tool for this relatively low-cost system.

It is still another object of the present invention to provide such a system that can track various aspects of customer activity attributable to the influencers' efforts, including local activity that can be effectively impacted by such micro-influencers.

In order to overcome the deficiencies of the prior art and to achieve at least some of the objects and advantages listed, one exemplary embodiment of the invention comprises a system for conducting a social media marketing campaign, including a campaign administration server with a processor and program computer code for administering a campaign, and one or more social media servers, each social media server hosting a social media platform. The system also includes a plurality of influencer devices associated with a plurality of respective influencers participating in the campaign from which the campaign administration server receives identification information for each influencer participating in the campaign, and from which the one or more social media servers receive social media posts by the plurality of influencers associated with the campaign, and a plurality of customer devices associated with a plurality of customers from which the one or more social media servers receive social media reactions responsive to the social media posts associated with the campaign received from the influencer devices. For each social media reaction attributable to each influencer, the campaign administration server awards the influencer a point amount corresponding to a point value assigned to the social media reaction, and for each detection of one of the customer devices at a location associated with the campaign that is attributable to the influencer, the campaign administration server awards the influencer a point amount corresponding to a point value assigned to the detection of one of the customer devices at the location. For each influencer participating in the campaign, the campaign administration server calculates a total point amount awarded to the influencer participating in the campaign, and the campaign administration server supplies a reward to at least some of the plurality of influencers participating in the campaign based at least in part on the total point amount awarded to each of the plurality of influencers.

In some embodiments, the campaign administrator server detects when one of the customer devices is at a location associated with the campaign using a geolocation technology. In some of these embodiments, the geolocation technology comprises the Global Positioning System.

In other embodiments, the campaign administrator server provides a graphic identifier to each of the influencers participating in the campaign for inclusion in the social media posts associated with the campaign such that the graphic identifier is accessible by the customer devices, wherein the campaign administrator server detects when one of the customer devices is at a location associated with the campaign upon receiving data reflecting use of the graphic identifier at the location. In some of these embodiments, the graphic identifier is a matrix barcode.

In some advantageous embodiments, the point value assigned to a type of social media reaction performed on a first social media platform is higher than the point value assigned to the type of social media reaction performed on a second social media platform. In some embodiments, the point value assigned to a first type of social media reaction is higher than the point value assigned to a second type of social media reaction.

In certain embodiments, the system further includes a potential influencer identification database, wherein the campaign administration server obtains identification information for a plurality of influencers from the database and communicates a campaign invitation to at least some of the plurality of influencers. In some of these embodiments, the potential influencer identification database includes information associated with each potential influencer, with which the campaign administration server determines to which of the plurality influencers it communicates the campaign invitation.

In some embodiments, the campaign server determines that the detection of the customer device at the location associated with the campaign is attributable to the influencer based on receipt of a code associated with the influencer from the customer device. In other embodiments, the campaign server determines that the detection of the customer device at the location associated with the campaign is attributable to the influencer based at least in part on a social media association between the customer associated with the customer device and the influencer. In still other embodiments, the campaign server determines that the detection of the customer device at the location associated with the campaign is attributable to the influencer based at least in part on a contemporaneous social media reaction by the customer associated with the customer device that is also attributable to the influencer.

In certain embodiments, the system of claim 1, wherein the campaign server publishes a current point amount for each influencer to the plurality of influencers during the campaign. In some embodiments, the campaign administration server electronically transfers the reward to the influencers.

The invention also comprises a system for conducting a social media marketing campaign, including a campaign administration server with a processor and program computer code for administering a campaign, and one or more social media servers, each social media server hosting a social media platform. The system also includes a plurality of influencer devices associated with a plurality of respective influencers participating in the campaign from which the campaign administration server receives identification information for each influencer participating in the campaign, and from which the one or more social media servers receive social media posts by the plurality of influencers associated with the campaign, and a plurality of customer devices associated with a plurality of customers from which the one or more social media servers receive social media reactions responsive to the social media posts associated with the campaign received from the influencer devices. For each social media reaction attributable to each influencer, the campaign administration server awards the influencer a point amount corresponding to a point value assigned to the social media reaction, wherein the point value assigned to a first social media reaction differs from the point value assigned to a second social media reaction based on at least one of: (a) the first social media reaction is performed on a first social media platform and the second social media reaction is performed on a second social media platform, and (b) the first and second social media reactions are different types of social media reactions. For each influencer participating in the campaign, the campaign administration server calculates a total point amount awarded to the influencer participating in the campaign, and wherein the campaign administration server supplies a reward to at least some of the plurality of influencers participating in the campaign based at least in part on the total point amount awarded to each of the plurality of influencers.

The invention also comprises a system for conducting a social media marketing campaign, including a campaign administration server with a processor and program computer code for administering a campaign, and one or more social media servers, each social media server hosting a social media platform. The system also includes a plurality of influencer devices associated with a plurality of respective influencers participating in the campaign from which the campaign administration server receives identification information for each influencer participating in the campaign, and from which the one or more social media servers receive social media posts by the plurality of influencers associated with the campaign, and a plurality of customer devices associated with a plurality of customers from which the one or more social media servers receive social media reactions responsive to the social media posts associated with the campaign received from the influencer devices. For each social media reaction attributable to each influencer, the campaign administration server awards the influencer a point amount corresponding to a point value assigned to the social media reaction, and for each detection of one of the customer devices at a location associated with the campaign that is attributable to the influencer, the campaign administration server awards the influencer a point amount corresponding to a point value assigned to the detection of one of the customer devices at the location, wherein the point value assigned to a first social media reaction differs from the point value assigned to a second social media reaction based on at least one of: (a) the first social media reaction is performed on a first social media platform and the second social media reaction is performed on a second social media platform, and (b) the first and second social media reactions are different types of social media reactions. For each influencer participating in the campaign, the campaign administration server calculates a ratio of (a) a total point amount awarded to the influencer participating in the campaign, to (b) a total point amount awarded to all influencers participating in the campaign, and the campaign administration server supplies a reward to at least some of the influencers participating in the campaign based at least in part on the ratio calculated for the influencer.

In some embodiments, the campaign administrator determines a total reward amount as a percentage of the fee collected from the campaign sponsor (business) and inputs that into the server, while in other cases, the server receives a total reward amount from a business sponsoring the campaign. In either case, the reward supplied to each influencer is the total reward amount multiplied by the ratio.

BRIEF DESCRIPTION OF THE DRAWINGS

FIG. 4 is a table illustrating an example allocation of influencer points in accordance with the invention.

DETAILED DESCRIPTION OF THE INVENTION

The following detailed description illustrates the technology by way of example, not by way of limitation, of the principles of the invention. This description will enable one skilled in the art to make and use the technology, and describes several embodiments, adaptations, variations, alternatives and uses of the invention, including what is presently believed to be the best mode of carrying out the invention. One skilled in the art will recognize alternative variations and arrangements, and the present technology is not limited to those embodiments described hereafter.

At a general level, the present invention employs a campaign server that is maintained by a campaign administrator. A business (campaign sponsor) wishing to conduct social media marketing using the claimed system, or a campaign administrator, accesses the campaign server via any client device (e.g., smartphone, personal computer, etc.) and inputs information relevant to the campaign, including duration, number of influencers, incentives and if appropriate, a total reward. Payment for the campaign is made electronically, by check or by cash from the campaign sponsor to the campaign server. The campaign administrator determines what portion of the campaign price will be used for the influencer reward pool. Typically, this is 30-40% of the campaign price, but can vary from 0%, if for example the influencers are receiving non-monetary compensation in goods or services, to 100%, if the campaign sponsor and campaign administrator have agreed on a separate fee to be paid to the campaign administrator. The campaign server sends invitations to social media influencers, who then post content to various social media platforms to try to influence end users of the relevant platforms (customers) to act in ways that are beneficial to the campaign sponsor, either by further advancing the marketing campaign (e.g, liking a post, sharing a link, etc.) or by actually generating revenue for the sponsor (e.g., spending money at a particular location, purchasing a product, etc.). The system tracks the social media reactions of customers (likes, shares, etc.) attributable to each particular influencer, as well as real-world activity, such as product purchases or physical attendance of customers at advertised locations (visiting a restaurant, store, etc.), that are attributable to that influencer, and points are awarded to the influencers based on the activity they generate among customers. The points are weighted according to the type of activity generated and/or the social media platforms on which the activity is generated, and the running point totals of the individual influencers are made available to all influencers taking part in the campaign in order to foster competition among them. At the conclusion of the campaign, the total reward is allocated among the influencers according to their relative total accumulated points.

Figure 1:
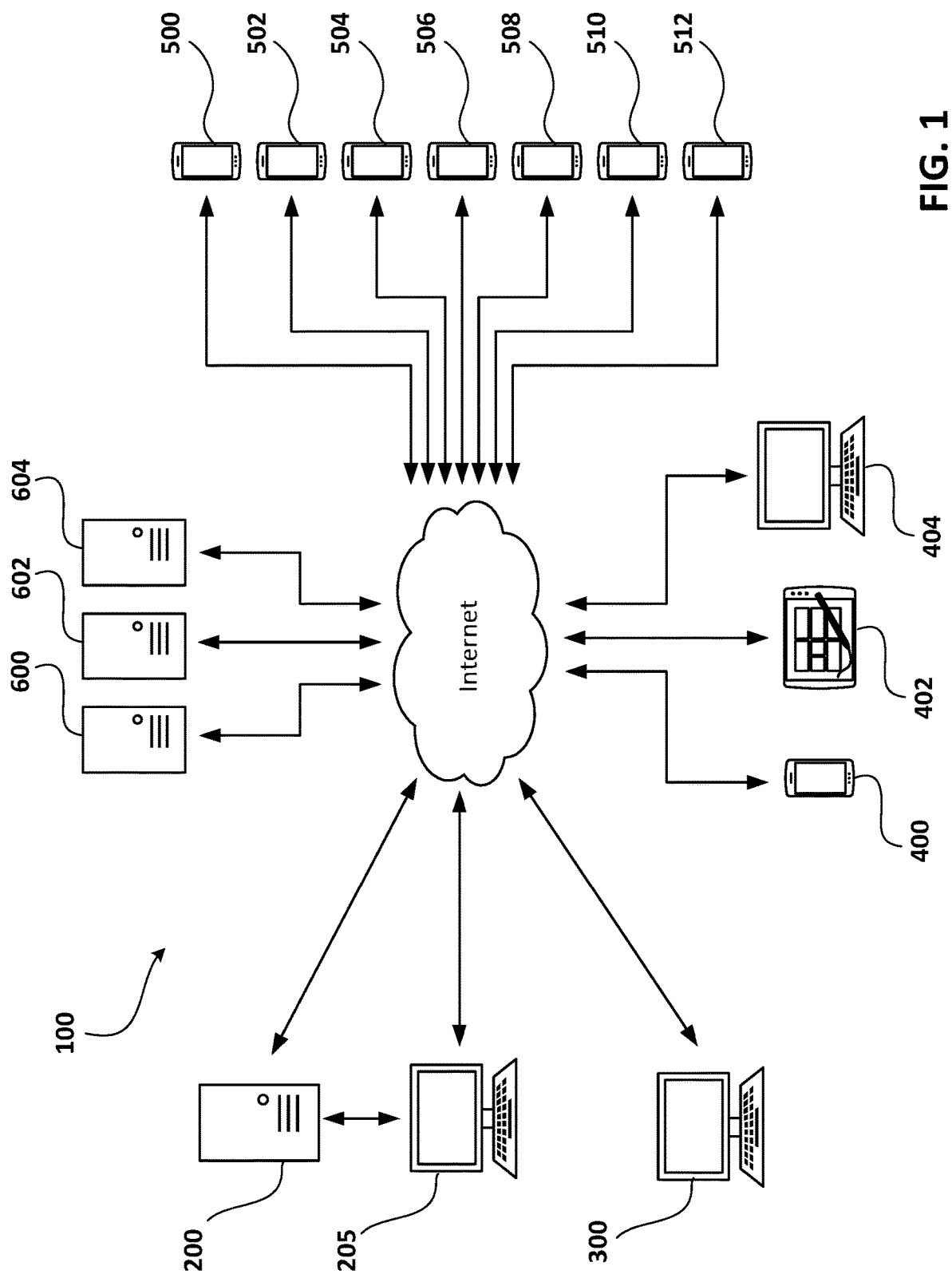
FIG. 1 is a schematic representation of a system according to exemplary embodiments of the present technology

Referring now to FIG. 1, depicted is a schematic representation of exemplary embodiments of the claimed system. The depicted system (100) employs a campaign server (200), including a processor and program code and software, which electronically communicates via a network (Internet) with a client device (300) of the business wishing to conduct marketing via the system (100), as well as a plurality of influencer devices (400), (402), (404). Both the business client device (300) and the influencer devices (400), (402), (404) can be any type of device capable of communicating with the campaign server (200), including a mobile device, a desktop or laptop computer, or any other device for accessing the internet, such as a streaming TV player, smart TV, gaming console, etc. It should be noted that, in lieu of (or in addition to) a client device (300) belonging to a business sponsor, a campaign administrator device (205) belonging to a campaign administrator can also be used to input campaign information into the system (100) and server (200).

The campaign server (200) also communicates with a plurality of customer mobile devices (500)-(512). These are typically smartphones, but like the influencer and client devices mentioned above, can be any type of mobile device, such as a smartwatch, tablet, personal digital assistant, handheld game console or other portable gaming system, smart glasses or other optical head-mounted display, or other portable device suitable for implementing the system described herein. The campaign server (200) also communicates with one or more social media servers (600), (602), (604), which can facilitate any of various kinds of computer-mediated communication in which information is shared among users in a virtual community or network, as further discussed below.

Figure 2:
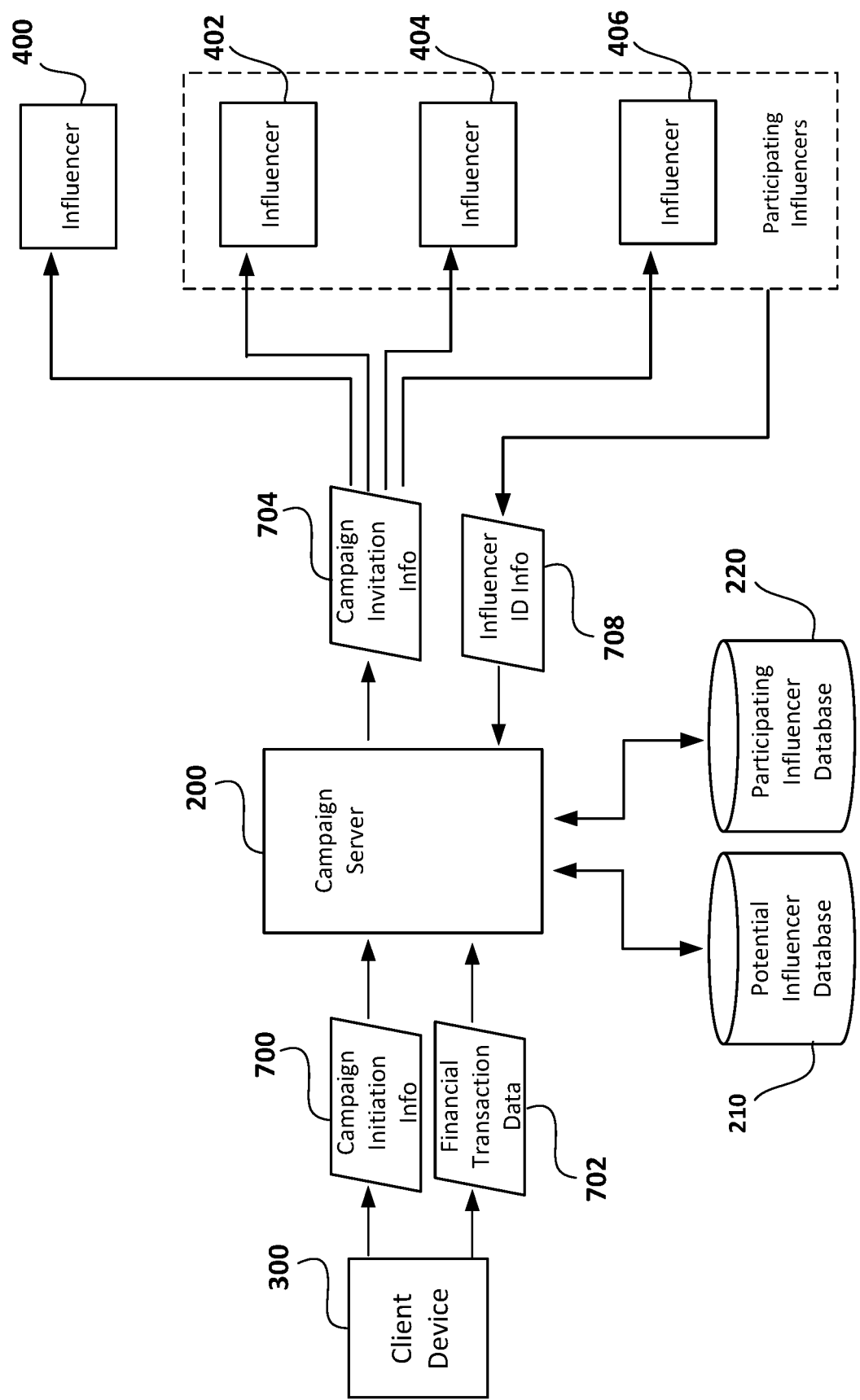
FIG. 2 is a block diagram illustrating the operation of part of the system of FIG. 1.

Referring to FIG. 2, the general operation of an exemplary embodiment of the system (100) is shown. When the campaign sponsor wishes to initiate a campaign, the business client (300) accesses the campaign server (200) via any of numerous devices, as described above. The server (200) may be accessed with any appropriate software on the client device, such as for example, a smartphone app provided by the campaign administrator, or a web browser for accessing a website maintained by the campaign administrator. However, it should be noted that the business client (300) itself need not necessarily access the server. For example, the business (300) may communicate with an account manager (i.e., sales associate) to discuss the nature and objectives of the campaign, as well any of the specific details of the campaign discussed further below. The account manager then inputs the campaign information, contract terms, and payment information to the campaign server (200) remotely or at the location of the server (200), or simply forwards the information to the campaign administrator, who then reviews, accepts (or rejects), and inputs the campaign to the server (200).

When the business client (300) accesses the campaign server (200), the business owner inputs campaign initiation information (700), which is transmitted to the campaign server (200). This may include information about the particular item(s) being marketed (e.g., location, type, and details of an establishment or event, description or pictures of products), any promotions or incentives associated with the event (e.g., discounts, coupons), any geographical limitations desired for the influencers (e.g., only influencers who live/work within a certain radius of the advertised location), any limitations on the types of social media posts or particular social media platforms to be used, a desired number of influencers, desired number of posts per influencer, a campaign duration, and any particular objectives of the campaign.

The campaign initiation information (700) may also include a total reward, such as a monetary reward (e.g., $200), which will be allocated according to the relative points awarded to the influencers (400), (402), (404), (406) based on each influencers relative effect on the targeted customers (500)-(512). The business client (300) then also transmits financial transaction data and payment (702) to the campaign server, which may comprise electronic currency, such as Bitcoin, authorization for an electronic payment, such as PayPal, other financial transaction data, such as credit card information or authorization to debit an existing account the campaign sponsor has with the campaign administrator. An additional fee may also be transmitted or authorized along with the reward amount, representing a service fee to the campaign administrator. Generally, however, the campaign administrator will determine the amount of money in the total influencer reward pool as a percentage of the campaign price. This has the advantage of including market knowledge from the campaign administrator about the amount of reward necessary to motivate influencers, or a targeted amount, or a minimum amount, that will create active and quality campaigns.

The total reward can also be a non-monetary reward (or a combination), typically (but not necessarily) associated with the campaign sponsor or the marketed location, event, product, or service. As just a few examples, such non-monetary rewards may comprise a certain number of digital coupons for free drinks at a bar, a certain number of gift certificates for a store, and a certain number of free admissions to an advertised concert, any of which would likewise be allocated to the participating influencers according to the relative points awarded to those influencers. Typically, the relevant coupon, code, etc. for redeeming these non-monetary rewards will be transmitted to the campaign server (200) for subsequent transmission to influencers as further discussed below. However, these rewards can also be distributed at the start or during a campaign to all or some influencers to provide motivation and products or services that can be used by influencers in their posts during the campaign; or they can be distributed at the conclusion of the campaign, as further discussed below. Also, as with monetary rewards, a monetary fee may also be transmitted or authorized, representing a service fee to the campaign administrator.

The campaign initiation information (700) also includes a time period for which the campaign will be conducted. A campaign can run for a day, a week, a month or any shorter or longer period of time. The time can also be extended or shortened during the campaign, if necessary, by the campaign sponsor or campaign administrator. The campaign can also be designated to repeat at a specified later date, or at regular intervals in the future, either in the same format or in a different format. These repeat campaigns can be designated to use the same influencers used for the original campaign, can exclude the influencers from the original campaign such that only new influencers can participate, or can simply select influencers in the same manner as in the original campaign (discussed further below), irrespective of whether the selected influencers previously participated. In a similar way, these repeat campaigns can be designated to use the same social media platforms as in the original campaign, different social media platforms, or both.

Once the campaign is initiated by the business client (300), the campaign server (200) accesses a potential influencer database (210) containing the identification information for a plurality of potential influencers. In some embodiments, the campaign server (200) will send campaign invitation information to all the influencers in the database (210). In other cases, the server (200) will select those influencers contained in the database (210) that are most appropriate for the current campaign.

One metric that the campaign server (200) may use when selecting which influencers in the potential influencer database (210) will be invited to join the current campaign is the influencers' geographic locations. For example, there may be a predetermined distance from the advertised location that the business wishes to target with the marketing campaign. This can be part of the campaign initiation information (700) input by the campaign sponsor so that the business can decide whether to impose a geographic limit at all, and if so, what distance is appropriate in view of the particular location or event being marketed. However, in some embodiments, a geographical limitation for the influencers is simply a preset value used by the campaign server (200).

The information associated with each potential influencer in the database (210) may include geographic information about the influencer, such as where he/she lives and/or works. As a result, the server (200) can search the database (210) and select only those influencers that live or work within the target area defined by the predetermined radius from the advertised location. Alternatively, other geographic designations, such as zip codes associated with the influencers, may be used.

In some embodiments, the server (200) may actively seek the current location of each potential influencer by determining the location of the influencer devices (400), (402), (404), (406) by using a geolocation technology, such as GPS. By doing so, the server can eliminate those influencers that are not currently in the target area. This selection of only those influencers currently in the vicinity of the advertised location may be desirable, for example, for a short-lived campaign that is marketing an imminent event (happy hour at a local bar), where the influencers' attendance at the event is part of the marketing strategy.

The campaign administration server (200) may employ various other parameters to determine which influencers should be enrolled in the particular campaign, such as the influencers' age, gender, interests, or other demographic information to determine the best matches for the given campaign. Influencers can also be categorized in the potential influencer database (210) for this purpose (e.g., foodies, moms, lifestyle enthusiasts, etc.). In some cases, this can also include demographics about the other users in the influencer's social network community. By doing so, the campaign server (200) is more likely to engage local influencers with local social networks that will promote the relevant local businesses. It should be noted that the aforementioned matching of influencers with campaigns can be accomplished by the campaign administrator with human analysis, artificial intelligence, or both.

Other metrics the campaign server (200) may use to select which influencers in the potential influencer database (210) will be invited to join the current campaign may be more tied to the influencer's social media presence. For example, the number of followers, social media activity, engagement of their activity by other users, metatags, and past campaign performance history associated with the influencers can all be employed for this purpose. Depending on the specific metrics desired, these can be determined from the campaign server's own store of historical data, or obtained using influence measurement technology, such as CreatorIQ.

Once the campaign server (200) has selected which influencers should be included in the campaign, it sends campaign invitation information (704) to the selected influencers (400), (402), (404), (406). The campaign information will generally include a description of the business, campaign duration, number of influencers, minimum number of posts per influencer, potential reward, incentives offered to the influencers and/or end users, and other campaign information. The selected influencers that wish to participate in the campaign can accept the invitation, at which point, influencer identification information (708) for each of the participating influencers (402), (404), (406) is sent to the campaign server (200) as confirmation of their participation and stored in participating influencer database (220). It should be noted that potential influencer database (210) and participating influencer database (220) may be part of the campaign server (200) or one or more separate devices in communication with the campaign server (200).

The campaign invitation information (704) may include a benefit useable by the influencers (400), (402), (404), (406), such as a discounted or free sample, trial, admission, or experience, in order to encourage the influencer to try the marketed venue or product and thereby enable them to create more authentic content for their posts. Alternatively, the benefit may be provided to participating influencers (402), (404), (406) after they have confirmed their participation in the campaign.

In other embodiments, campaign invitations can be made available to potential influencers without first selecting appropriate influencers. For example, the new campaigns can be posted to the campaign administrator's website, and influencers can periodically check the website to see what campaigns are currently available. If an influencer decides he/she would like to participate in a particular campaign, the influencer can notify the campaign administrator of their interest and provide their information via the website or another accepted method.

Similarly, in embodiments where the campaign administrator has provided an application for installation on influencers' devices (e.g., smartphone app), either directly, through a third party or through Apple or Google/Android stores, new campaigns may be posted thereto, and potential influencers can simply check the application for available campaigns. In such cases, the app may be programmed to send a notification or "alert" to influencer's devices when a new campaign becomes available.

In those cases where campaign invitations are made available to potential influencers without first selecting appropriate influencers, the campaign server (200) may subsequently vet those influencers that have sent notification of their interest. For example, the campaign server (200) may perform any of the analyses described above to determine which of the interested influencers will be accepted for participation in the campaign. In some embodiments, the server (200) will either accept or reject each interested influencer based on whether the influencer meets certain criteria, while in other cases, the server (200) will select a specified number of influencers using the above-described analyses to determine the best matches from among all the interested influencers. In other embodiments, the system will simply close the campaign invitation phase once the specified number of influencers have confirmed interest.

Figure 3:
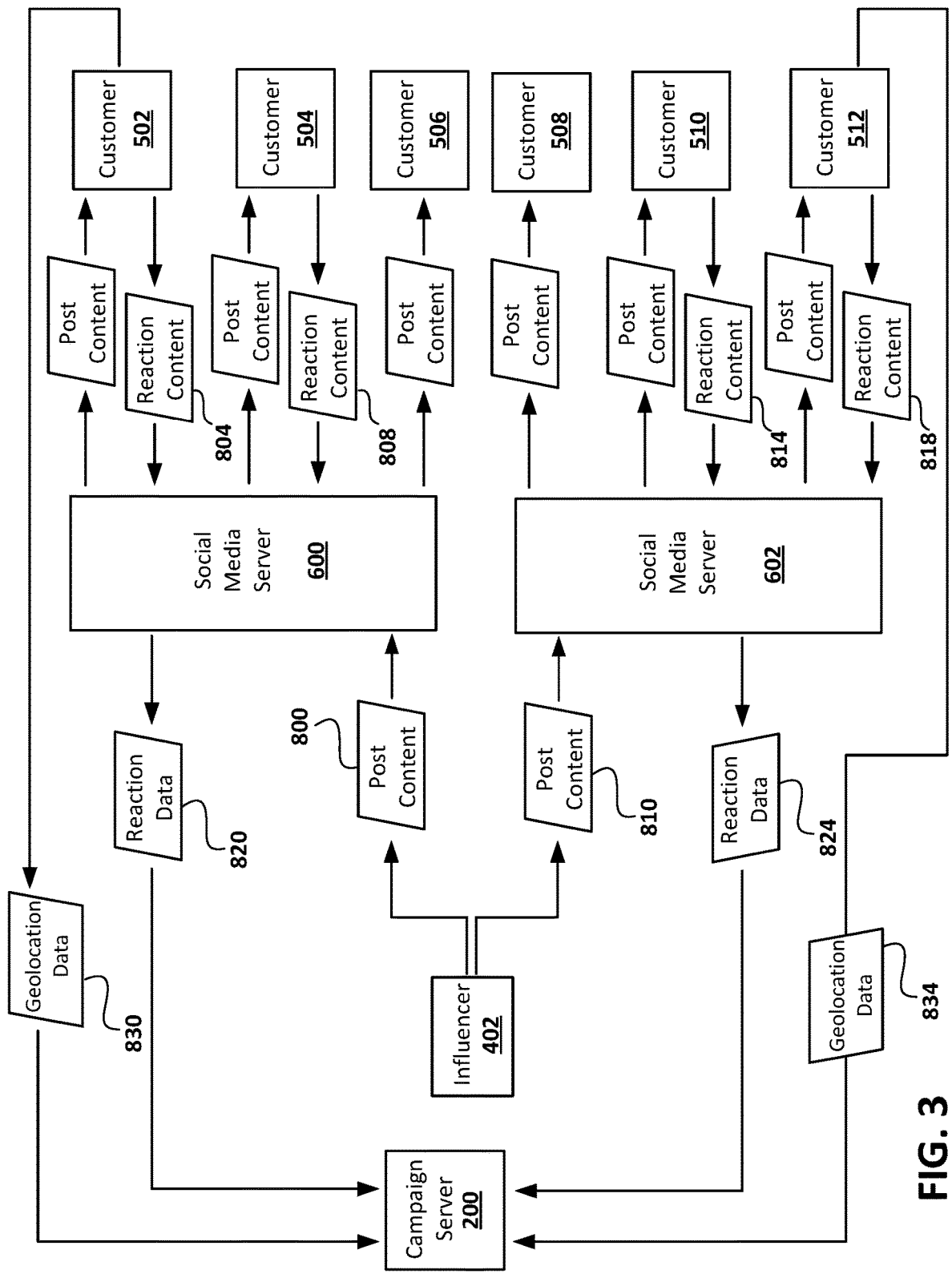
FIG. 3 is a block diagram illustrating the operation of part of the system of FIG. 1.

Referring to FIG. 3, once influencers have been secured and the campaign has begun, a participating influencer (402) posts content related to the campaign, such as text, photos, video, or hyperlinks to one or more social media platforms, which can be any online platform in which one or more types of such user-generated content is shared with other users. This may include, for example, a general purpose social networking platform, such as Facebook, Google+, and MySpace, and well as similar professional networks, such as LinkedIn. It may also include microblogging platforms that focus on short texts or updates, such as Twitter, Weibo, and Tumblr, as well as blogging platforms that focus on longer publications like opinions and articles, such as Blogger and Wordpress. This may also include photo sharing platforms, such as Instagram, Snapchat, Pinterest, and Flickr, as well as video sharing platforms, such as Periscope, YouTube, Vimeo, and Vine.

The post content posted by the participating influencer (402) can be in any form typically posted to a social media platform, including text, photos, other images (e.g., PDF), video, hyperlinks, etc. As just one example, for a campaign aimed at driving prospective diners to a restaurant, the post content could include photos of certain dishes served at the restaurant, a PDF of the menu, a hyperlink to the establishment's website, text representing testimonials and other laudatory comments, and promotional material (such as a scannable coupon). These posts can use pre-determined content, which may be determined by the campaign sponsor as part of the campaign initiation information (700), can be self-created content of the influencer, or a combination of both. For example, the post content could comprise influencer-created text promoting a restaurant, photos from an influencer visit to the restaurant, and a sponsor-created coupon image to be posted along with it.

In the example shown, influencer (402) makes a post comprising text indicating that they will be visiting a local bar, along with a hyperlink to the website for that bar. This post content (800) is transmitted to a first social media server (600) appropriate for this type of content, such as Facebook, from which other social media users can access the post content via their associated customer devices (500)-(512). Three customers (502), (504), (506) view this post content. Upon viewing the post, customer (502) responds with a first type of social media reaction, in the form of a "like," and this reaction content (804) is transmitted to the social media server (600). Meanwhile, customer (504) responds with a second type of social media reaction, in the form of "sharing" the post with their own Facebook friends on their own Facebook page, and this reaction content (808) is also transmitted to the social media server (600). Customer (506), on the other hand, does not respond with any type of social media reaction after viewing the post, and thus, does not transmit any reaction content to the social media server (600).

In the example shown, the same influencer (402) then also takes a selfie in front of the bar, and posts this photo with a caption that says, "Having a great time, come join!" This post content (810) is transmitted to a second social media server (602) appropriate for this type of content, such as Instagram, from which other social media users can access the post content via their associated customer devices (500)-(512). Three customers (508), (510), (512) view this post content. Upon viewing the post, customer (508) does not respond with any type of social media reaction, so no reaction content is transmitted to the social media server (602) from this customer device. However, customer (510) responds with a first type of reaction, in the form of a "like," and this reaction content (814) is transmitted to the social media server (602), while customer (512) responds with a different type of reaction, in the form of a comment to the photo, and this reaction content (818) is also transmitted to the social media server (602). It should be noted that, although in this particular example the customers (502)-(506) are different from the customers in (508)-(512), there could be some overlap, or complete overlap, among the customers accessing the post content via social media server (600) and social media server (602).

As noted above, in certain cases, when the business client (300) inputs the campaign initiation information (700), he/she sets the total value of the reward that will be awarded to the influencers (400), (402), (404), (406), which will be allocated according to the relative points awarded to those influencers based on the influencer's influence on the targeted customers (500)-(512). Generally, however, the campaign administrator will determine the total influencer reward pool as some percentage of the campaign price paid by the business client to the campaign administrator for the campaign. In order to assess each particular influencer's relative influence on those customers, the system can track certain kinds of activity caused by that influencer's post content. The system does this in multiple ways.

One way in which the system gauges each influencer's influence on customers is by tracking the amount of social media engagement by customers attributable to that influencer—i.e., tracking the reactions on the social media platform (e.g., likes, comments, clicks, shares, etc.) to that influencer's social media post. As noted above, these social media reactions are transmitted to the social media servers (600), (602), and the social media servers (600), (602) then transmit reaction data (820), (824) reflecting these reactions to the campaign server (200). For example, the campaign server (200) may use an application programming interface (API) provided by the relevant social media service to obtain this reaction data. Besides obtaining the data directly from the social media platforms (e.g., Facebook, Instagram, Twitter), the server may alternatively employ a dedicated social analytics provider, such as Gnip, Datasift, or CreatorIQ, to obtain the social media data. It should be noted that the tracking of the social media engagement by end users can be accomplished in a number of different ways, such as, for example, via the use of a unique identifying code assigned to each influencer, or as another example, via the use of a specific hashtag. The campaign server (200) then uses this reaction data obtained via the social media API to allocate and award points, as discussed in greater detail below.

In addition to tracking this virtual activity, another way in which the system gauges each influencer's influence on customers is by tracking physical or other real-world activity—i.e., activity other than social media reactions—that are performed by customers and are attributable to that influencer. This may comprise physically going to a location, making a purchase (either at a retail or online store), making a reservation, placing a call to inquire about a product, service, or event, making a donation, or taking some other desired, real-world action. These actions are generally considered more desirable than social media reactions, as these tend to more directly translate into revenue for the campaign sponsor, and thus, they will often carry a higher value and weighting when awarding points, further described below.

For instance, one common form of tracking real-world activity is tracking the physical attendance of customers at a particular location. This could, for example, take the form of visiting an established business, such as a restaurant or bar, an exercise studio, a store, or an entertainment venue (e.g., amusement park, museum, etc.). This could also take the form of attending a given event, such as a concert, a show, a party, or a sport game, which may occur once or repeatedly, and which may take place at only one location or multiple locations.

In order to perform this tracking, some embodiments of the system employ a geolocation technology, such as GPS, to determine the location of the customers. In some cases, the campaign server (200) may rely on self-reporting of the customers, who indicate via their customer devices that they are at the advertised location. For example, promotional material disseminated by the influencer (402) as part of the post content (800), (810) may indicate that free admission, or a coupon for use at the establishment, can be downloaded when (and only when) the customer "checks-in" at the advertised location. As a result, once customers (502), (512) arrive at the location, they click a relevant button or link confirming their presence there. The campaign server (200) receives geolocation data (830) and (834) from the devices (502) and (512), respectively, with which it confirms the presence of those customers at the advertised location, and then subsequently transmits the digital ticket or coupon for use.

Alternatively, the campaign server (200) can establish a geo-fence around the advertised location, such that when customer devices (502), (512) enter the actual location corresponding to this virtual perimeter, the devices (502) and (512) each transmit their respective data to the server (200) alerting the server (200) of this.

To facilitate the proper attribution of the attendance by customers (502), (512) to the correct influencer (402), influencer identity data may also be transmitted along with the geolocation data. This can be done in any of various ways, including, for example, a query to customers (502), (512) about which influencer provided the promotional information, which must be answered in order to download the promotional coupon or ticket. The customer may be prompted to enter a code associated with that influencer and displayed in the influencers post, or may be presented with a list of participating influencers such that the customer can select the responsible influencer. Alternatively, each influencer can be assigned a unique code that is embedded in the relevant button or link disseminated by the influencer (402) and used by the customers (502), (512) to check-in.

Other ways of attributing the geolocation of the users (502), (512) to the particular influencer (402) can also be employed. For example, a correlation between a customer (502), (512) detected at the advertised location and a particular influencer (402) can be established based on a contemporaneous (during the campaign) social media reaction by the customer. For instance, if the detected customer posted a comment about attending the advertised event to a particular influencer's social media post, there is a higher likelihood this influencer's post is responsible for that customer's attendance at the location than other influencer's posts, and the relevant points can be awarded to this influencer. If the detected customer posted a social media reaction to the posts of multiple influencers relating to the campaign, the points can be awarded to the influencer who first received a social media reaction from this customer, the points can be award to each of those influencers, or the points can be divided among those influencers. The social media reactions may also be ranked according to type and platform, and this ranking can be used to determine a particular allocation of the points or which of the multiple influencer(s) will be awarded points.

As another example, a correlation between a customer detected at the advertised location and a particular influencer can be established based on a social media association between the influencer and the customer. For instance, if the detected customer is "friends" with an influencer on Facebook, or is "following" an influencer on Instagram, there is a higher likelihood this influencer's post is responsible for that customer's attendance at the location than other influencer's posts, and the relevant points can be awarded to this influencer. If there is a social media association between the detected customer and multiple influencers, the points can be awarded to each of those influencers, or the points can be divided among those influencers.

In other embodiments, the physical attendance of customers at an advertised location is tracked using a scannable identifier unique to the influencer (402). For example, a graphic identifier, such as a barcode, that is unique to each of the participating influencers can be included in the post content (800), (810), such that the barcode is accessible by the customer devices (502)-(512). The sponsor maintains a scanner at the advertised location, such as the sponsor restaurant. The scanner captures this code from a customer device (502) when scanned, indicating that the customer is present, and a notification that the customer is located at the advertised location, along with the identity of the influencer (402), is transmitted to the campaign server (200). In some embodiments, this barcode is a matrix barcode (or two-dimensional barcode), such as a QR Code.

Various incentives can be provided for motivating the scanning of such codes by the customer, such as discounts. Such codes can also be used to detect and report activity other than the location of the customers, including the purchase of a product or payment for some other service or benefit (e.g., admission, dinner, etc.). Such codes can be scanned when the user physically attends an advertised location, or they can be processed by a camera and imaging software, such as when making an online purchase.

In cases where coupons or discounts attributable to particular influencers are redeemed, the number of redemptions attributed to that specific influencer and/or the dollar amount of associated purchases/spend can also be transmitted to the campaign server (200) for use in awarding points, as further explained below. This is helpful in determining actual dollars spent at a venue, or on purchases of products/services, as a result of a campaign in order to present a return on investment assessment to the campaign sponsor.

Generally, different types of social media reactions (clicks, likes, comments, shares, etc.) are assigned different point values. For example, a 'share' will typically have a higher point value than a 'like' in view of the fact that a share more directly further propagates the marketing content itself and can quickly lead to exponentially more customers viewing the content. For example, in one campaign, a 'like' is worth 5 points, a comment is worth 10 points, and a 'share' is worth 20 points. The actual points awarded for an engagement activity can be any number determined by the administrator, but it will generally reflect the desirability and value of an action by the recipient of an influencer's post.

Similarly, in a particular marketing campaign, or more generally, a higher number of points can be awarded for a given type of social media reaction by a customer on one social media platform than on another social media platform. For example, a 'like' on Instagram may be assigned a lower or higher point value than a 'like' on Facebook. This may be based on a greater popularity of one platform relative to another during a certain time frame, or to certain trends or preferences for a particular platform by a specific target market, target audience, etc. Typically, this will be done by the campaign administrator, but can also be done a campaign sponsor.

In a typical scenario, the campaign administrator assigns a specific number or points for a given social media reaction that is similar across social networks, but whose point value is weighted for certain social media platforms based on the relevance of those particular platforms to a particular marketing campaign. Additionally, while social media reactions will often be similar across social networks, there may be particular engagement activities available on one network that are not available on all networks.

The above-described physical or real-world activity (non-social media reactions) are also awarded points, the value of which likewise depends upon the particular type of activity and is generally established by the campaign administrator. As noted, these actions are generally considered more desirable than social media reactions, and thus, they will often carry a higher value and weighting when awarding points. However, this is not always the case, and certain real-world activities can be assigned a zero-point value if no specific physical actions by end users are expected. For example, a campaign may be run simply for the purpose of generating awareness, for reporting the success of a previous event, for announcing a planned product launch, or as a public service message to the community.

Referring to FIG. 4, an example allocation and weighting of points is shown. In this example, social media platform A is more relevant to a specific campaign, and therefore, any social media reactions thereon by customers are weighted 50%. Social media platform B has an additional reaction feature that has a high point value (25 points), but the platform overall is determined by the administrator, or customer, or processor to be less desirable for a particular campaign, and thus, is weighted at 30%. Social media platforms C and D have the same reaction features as social media platform A, but these platforms are less desirable for the campaign, and therefore, are each weighted at 10%. Hence, the value of a social media reaction on platform A, such as a 'like,' will have a higher weighted value, 2.5 points, than a similar reaction on platform B, where a 'like' is valued only at 1.5 points.

The weightings and point values are variables that can be input into the processor by the administrator and assigned to reactions in the social community during the campaign. In this example, social media platform A has a higher weighting than B, C, or D, but the administrator may assign the same weighting to all social media platforms. In some cases, platforms may be dropped if not relevant to a campaign, or new platforms may be added.

In the example illustrated, point values established for real-world actions are: 100 points for a visit, 100 for an online purchase, 50 points for a call, 50 points for a reservation, and 0 points for a donation. These reflect the expected value to the campaign sponsor for a specific customer action. As noted, the weighting is generally higher for a physical action, and here is set at 60%, while social media reactions are only 40%.

In this example, Influencer 1 is determined to have accumulated 1,250 engagement points during a campaign for a restaurant's two-for-one dinner special via a combination of social media reactions by end users in her social media community across the social media platforms A-D. Influencer 2 has registered 500 points, and Influencer 3 has registered 250 points. The points have been generated by taking the point value of a specific reaction (like, comment, share, other) multiplied by the number of end user engagement actions attributed to an influencer, and further multiplied by the weighting for a particular social media platform on which such reaction took place. As shown, while a 'like' has a standard value of 5 points, the weighted value on platform A is 2.5 points, while it is 1.5 points on platform B and 0.5 points on platforms C and D.

The total of the weighted reaction points for an influencer can further be weighted from a range of 0-100% of their value depending on the significance of the social media reactions to a campaign versus physical (or real-world) actions by a customer. In some cases, social media reactions will have a weighted value of 0% where the emphasis of a campaign is strictly on generating real-world actions by customers, such as visits or purchases.

As noted, points for real-world actions by customers are generally of a higher value. In this example, these actions are assigned a value of 100 points for a customer visit or online purchase (e.g., online takeout order) and 50 points for a call or reservation. There are no points awarded for a donation, as it is not a relevant action for the restaurant campaign, and thus, it is set at 0 points by the administrator. The social media reactions attributable to Influencer 1 resulted in 3 visits to the restaurant with a value of 300 points, while Influencers 2 and 3 were credited with 2 visits and 5 visits, respectively, as determined from scans by the restaurant of customers' QR codes associated with the respective influencers. Those scans were electronically or wirelessly transmitted to the administrator's server, and points were credited to the influencer to which the visit was attributed. The weighting for real world action points will typically be weighted from 60-70% for a campaign but can be set at anywhere from 0% to 100% by the campaign manager or, if allowed, by the campaign sponsor.

In this example, Influencer 1 has a weighted point value of 500 engagement points and a weighted point value of 180 action points, for a total of 680 award points. Influencer 2 has a total weighted point value of 320 award points and Influencer 3 has a total weighted value of 400 award points.

The total weighted point value is 1,400 award points. This total becomes a divisor, and each influencer's percentage of the monetary reward pool is determined by calculating their respective percentage of this pool, represented by their weighted award points divided by the total weighted award points multiplied by the award pool dollars (or travel points, credits, or other non-monetary reward). In this example, Influencer 1, with a total of 680 weighted award points, will receive 48.6% of the total award pool, while Influencer 2 will receive 22.9%, and Influencer 3 will receive 28.5%.

Therefore, using a total award pool for a campaign of $500 (as determined by the campaign administrator) Influencer 1 will receive 0.486×$500=$243, while Influencer 2 will receive 0.229×$500=$114.50, and Influencer 3 will receive 0.285×$500=$142.50 in this example.

Additionally, influencers can receive points for their own real-world activity, such as visits to an advertised establishment or purchases or trials of a product or service. As a result, influencers are encouraged to actually engage with the establishment or product and thereby boost the authenticity of their social media posts.

The number of points available for award is generally unknown but can be fixed, and it may vary with the number of influencers invited to participate or accepted in a campaign, as well as the activity of the influencers on social media and the actions of customers with social media or real-world reactions to that influencer activity. The available points, and the way points are allocated, can be either shared or not shared in advance with the influencers taking part in the campaign. In certain cases, no points will be awarded, and a fixed percentage of the total reward amount will be allocated by the administrator to each influencer regardless of the activity generated by that influencer.

In some campaigns, a maximum number of points can be established, either by default, by the administrator or at the direction of the business client (300) when initiating the particular campaign. In these cases, once the maximum number of points are awarded, the server (200) stops awarding points. In this way, influencers can be encouraged to quickly begin posting substantial content on many social media platforms to try to maximize their score before the available points are exhausted. The maximum number of points can be established in lieu of a campaign duration or can simply be a number at which the campaign is terminated, regardless of how much time is left.

Figure 5:
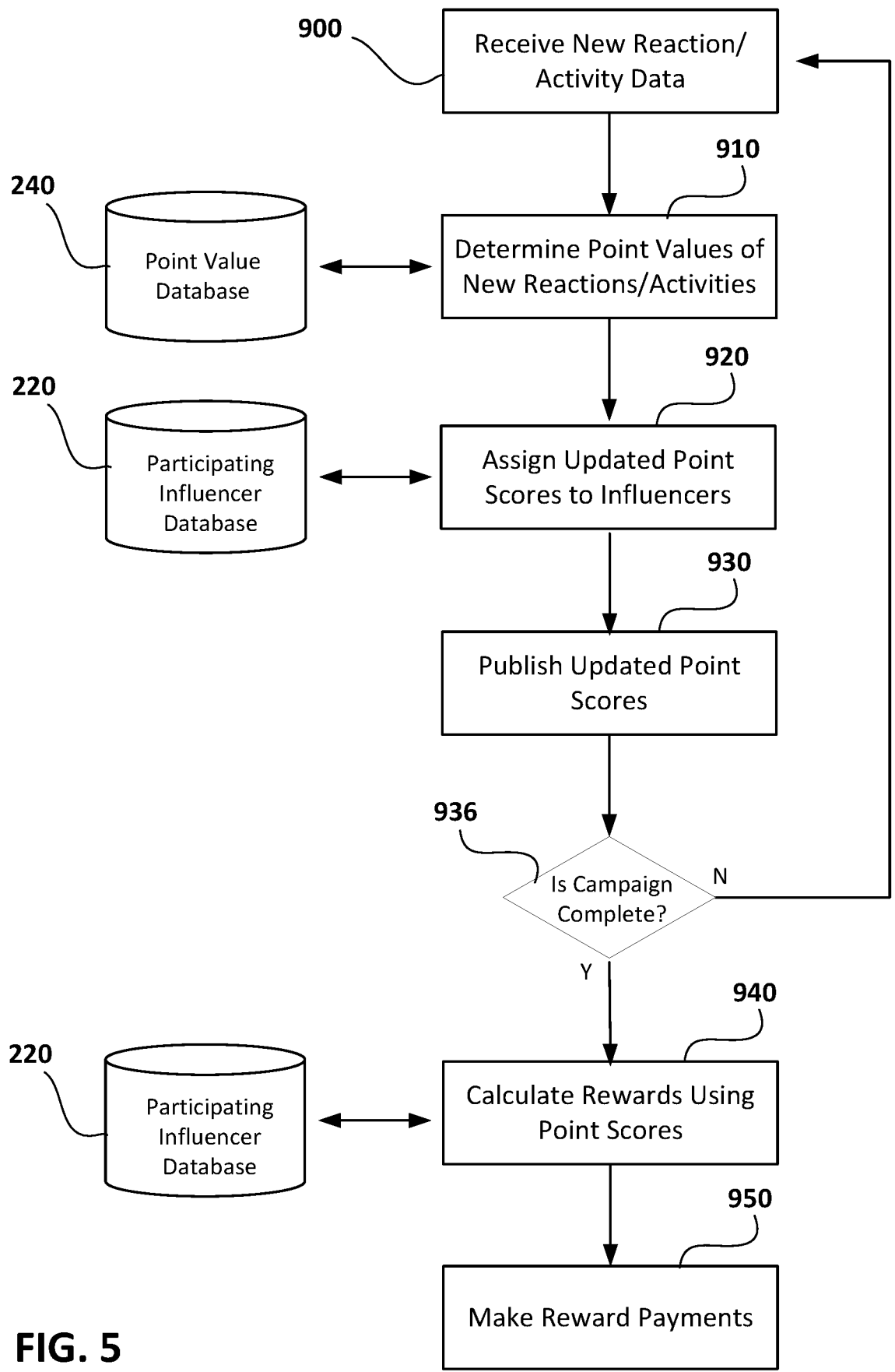
FIG. 5 is a flow chart illustrating the operation of part of the system of FIG. 1.
Figure 6:
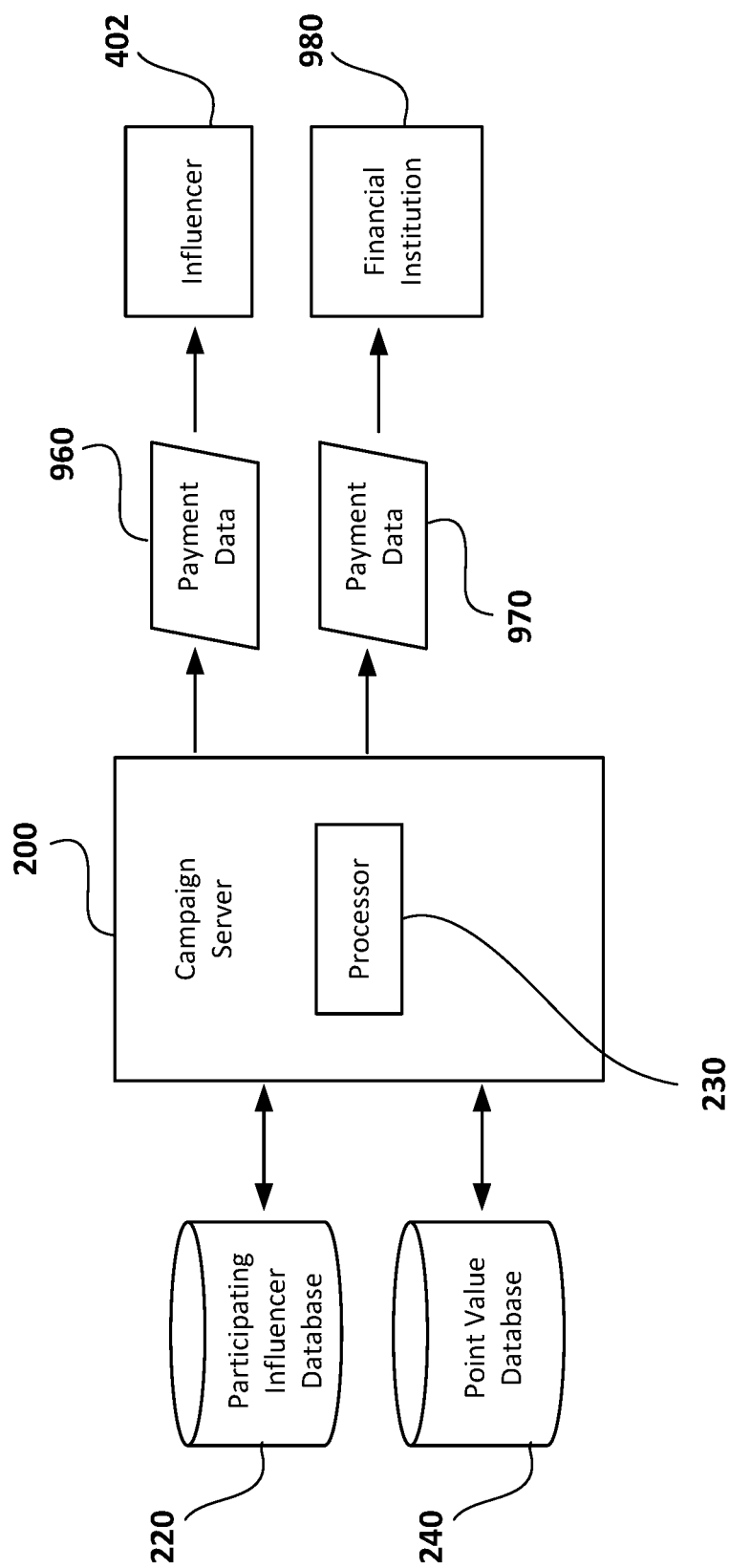
FIG. 6 is a block diagram illustrating the operation of part of the system of FIG. 1.

Referring to FIGS. 5-6, a basic operation of tabulating, awarding, displaying, and making payment based on relative point values is shown. Upon the receipt (900) by the campaign server of new data reflecting social media reactions and/or real-world activity (such as location attendance or product purchases) attributable to particular influencers, the campaign server accesses (910) a point value database (240), which is part of or in communication with the server (200), to obtain the point values associated with those activities, as well as the point values associated with relevant social media platforms, if applicable. The server (200) then retrieves (920) the current point amounts ("scores") accumulated by participating influencers from the participating influencer database (220), and a processor (230) with appropriate software, which is part of or in communication with the server (200), calculates updated point scores for those influencers using the point values obtained from the point value database (240) and stores these updated point scores in the participating influencer database (220).

During a campaign, the point scores and/or any other desired relative metrics (such as number of posts) for the individual influencers are then shared with the influencers, the sponsor, and the administrator. The relative performance of the influencers is published (930) to a web site or mobile application for review by other influencers (as well as the campaign administrator and/or the campaign sponsor). This representation of performance can be represented in tabular form, as a bar chart, with a speedometer, or using any other desirable graphic. In some cases, the point scores are shown, while in others, only the relative ranks are shown (without revealing the actual point amounts). It may also show the elapsed time in a campaign and/or the time remaining in a campaign. Publishing the relative performance of all (or a select group of) influencers in this way results is gamification of the act of influencing social media users, instilling a sense of competition among the influencers that are taking part in the campaign.

As illustrated (936), if the campaign has not yet concluded, this process is repeated until the campaign is complete, and can be performed continuously or at predefined intervals.

At the conclusion of the campaign, the individual influencer performance scores are used to rank the activity generated by a specific influencer relative to other influencers in the campaign. This allows the administrator or sponsor to identify those influencers generating the most activity for a specific topic and campaign. This information can also used by the administrator or sponsor to determine which influencers to invite for future campaigns. It should be noted that this publication of the relative performance of the influencers can be posted in real time or with a delay, and can be published at the conclusion or at any time during a campaign.

Similarly, the activity on any social platform by type of engagement can be used to show the relative performance of a platform. If desired, the weighting for a particular platform can be adjusted in the processor by the campaign administrator during the campaign or for future campaigns based on this information.

In some campaigns, influencers not achieving a minimum threshold of engagement activity may be dropped from the campaign, and may no longer be eligible for any portion of the award. In other cases, if additional activity is desired, additional influencers may be added during the course of the campaign by the sponsor or administrator.

Upon completion of the campaign, the campaign server calculates (940) rewards payable to the influencers. The reward for each individual influencer is determined by calculating a monetary reward based at least in part on the number of their total accumulated points relative to the total points accumulated by all participating influencers during the campaign. In certain embodiments, the campaign administration server (200) calculates the monetary reward payable to each individual influencer by calculating a ratio of that influencer's total accumulated points divided by the total points accumulated by all participating influencers during the campaign, and multiplying the total reward pool by that ratio. While this will usually occur at the conclusion of the campaign, rewards may be calculated, and some or all of the total reward amount may be disbursed to the participating influencers, at interim steps during a campaign, if desired.

The server (200) then transmits the award (950) payable to each influencer to that influencer by electronic deposit, such as by PayPal, Venmo, Bitcoin, or other similar method. Alternatively, the campaign sponsor can make payment to an influencer in cash, by check, or by wire transfer. In some embodiments, multiple payment methods may be employed, and the payment method may be selected by the influencer. For example, if influencers (402) and (404) are each entitled to a monetary award, the campaign server may transmit payment data (960) directly to the influencer (402) in the form of electronic currency, such as Bitcoin, while transmitting payment data (970) to a financial institution (980) in order to send a wire transfer to influencer (404). While any of these payment types may be employed, payment will generally be by electronic transfer from the campaign administrator's account directly to the accounts of the influencers.

In other cases, non-monetary benefits, such as goods, services, admissions, discounts, or performance award points can be used to reward influencers. These payments will typically be made to the influencer by electronic transfer, but like monetary rewards, can be otherwise delivered if desired.

It should be noted that, although the system has been described as employing a total value of the reward that is allocated among the participating influencers according to the relative points awarded to those influencers, in other embodiments, there is not a definitive total reward amount. In some embodiments, rewards for individual influencers may instead directly correspond to the actual number of points accumulated by that influencer, regardless of how many points other influencers receive, and regardless of the sum total of those rewards. In other embodiments, a fixed amount is paid each time a particular activity is generated by an influencer's post. For example, a bonus award may be available for each instance of a particular, highly desirable reaction, such as a 'share' by a customer on Facebook or for a particularly creative post or video.

In some embodiments, customers who are not registered as influencers may register as ordinary users of the system so that they can receive notifications on their mobile devices (or other hardware) of campaigns that provide promotional discounts or that relate to topics of interest to them. Such notification may be, but is not necessarily, triggered by the detection of a customer's geolocation within a certain vicinity. Once notified of a campaign of interest, the customer can check in and/or redeem the discount in any of the ways previously described.

What is claimed is:

1. A system for conducting a social media marketing campaign, comprising:
   a campaign administration server with a processor and program computer code for administering a campaign;
   one or more social media servers, each social media server hosting a social media platform;
   a plurality of influencer devices associated with a plurality of respective influencers participating in the campaign from which said campaign administration server receives identification information for each influencer participating in the campaign, and from which said one or more social media servers receive social media posts by the plurality of influencers associated with the campaign; and
   a plurality of customer devices associated with a plurality of customers from which said one or more social media servers receive social media reactions responsive to the social media posts associated with the campaign received from the influencer devices;
   wherein, for each social media reaction by each customer that is attributable to each influencer, the campaign administration server awards said influencer a social media reaction point amount corresponding to a point value assigned to said social media reaction, wherein said social media reaction point amount is awarded independently of any other social media reaction and the location of said customer;
   wherein, for each detection of one of said customer devices at a location associated with the campaign that is attributable to said influencer, said campaign administration server awards said influencer a customer location point amount corresponding to a point value assigned to the detection of one of said customer devices at the location, wherein said customer location point amount is awarded independently of any social media reactions at the location;
   wherein, for each influencer participating in the campaign, said campaign administration server calculates a total point amount reflecting the sum of all social media reaction point amounts and all customer location point amounts awarded to said influencer during the campaign; and
   wherein said campaign administration server supplies a reward to at least some of the plurality of influencers at the conclusion of the campaign based at least in part on the total point amount awarded to each of the plurality of influencers.

2. The system of claim 1, wherein said campaign administrator server detects when one of said customer devices is at a location associated with the campaign using a geolocation technology.

3. The system of claim 2, wherein said geolocation technology comprises the Global Positioning System.

4. The system of claim 1, wherein the campaign administrator server provides a graphic identifier to each of the influencers participating in the campaign for inclusion in the social media posts associated with the campaign such that the graphic identifier is accessible by the customer devices, wherein the campaign administrator server detects when one of said customer devices is at a location associated with the campaign upon receiving data reflecting use of the graphic identifier at the location.

5. The system of claim 4, wherein the graphic identifier is a matrix barcode.

6. The system of claim 1, wherein the point value assigned to a type of social media reaction performed on a first social media platform is higher than the point value assigned to said type of social media reaction performed on a second social media platform.

7. The system of claim 1, wherein the point value assigned to a first type of social media reaction is higher than the point value assigned to a second type of social media reaction.

8. The system of claim 1, further comprising a potential influencer identification database, wherein said campaign administration server obtains identification information for a plurality of influencers from said database and communicates a campaign invitation to at least some of the plurality of influencers.

9. The system of claim 8, wherein said potential influencer identification database includes information associated with each potential influencer, with which said campaign administration server determines to which of the plurality influencers it communicates the campaign invitation.

10. The system of claim 1, wherein said campaign server determines that the detection of said customer device at the location associated with the campaign is attributable to said influencer based on receipt of a code associated with said influencer from said customer device.

11. The system of claim 1, wherein said campaign server determines that the detection of said customer device at the location associated with the campaign is attributable to said influencer based at least in part on a social media association between the customer associated with said customer device and said influencer.

12. The system of claim 1, wherein said campaign server determines that the detection of said customer device at the location associated with the campaign is attributable to said influencer based at least in part on a contemporaneous social media reaction by the customer associated with said customer device that is also attributable to said influencer.

13. The system of claim 1, wherein the campaign server publishes a current point amount for each influencer to the plurality of influencers during the campaign.

14. The system of claim 1, wherein said campaign administration server electronically transfers the reward to said influencers.

15. The system of claim 1, wherein the campaign administrator server enables adding or deleting influencers during the campaign.

16. The system of claim 1, wherein the campaign administrator server enables adjusting the duration of the campaign during the campaign.

17. The system of claim 1, wherein the campaign administrator server enables adjusting a weighting of a social media platform during the campaign.

18. The system of claim 1, wherein:
for each influencer participating in the campaign, said campaign administration server from time to time during the campaign calculates a current total point amount reflecting the sum of all social media reaction point amounts and all customer location point amounts awarded to said influencer during the campaign;
wherein, for each influencer participating in the campaign, said campaign administration server, prior to the conclusion of the campaign, publishes during the campaign the current total point amount reflecting the sum of all social media reaction point amounts and all customer location point amounts awarded to said influencer during the campaign to incentivize competition among the plurality of influencers.

19. A system for conducting a social media marketing campaign, comprising:
a campaign administration server with a processor and program computer code for administering a campaign;
one or more social media servers, each social media server hosting a social media platform;
a plurality of influencer devices associated with a plurality of respective influencers participating in the campaign from which said campaign administration server receives identification information for each influencer participating in the campaign, and from which said one or more social media servers receive social media posts by the plurality of influencers associated with the campaign; and
a plurality of customer devices associated with a plurality of customers from which said one or more social media servers receive social media reactions responsive to the social media posts associated with the campaign received from the influencer devices;
wherein, for each social media reaction attributable to each influencer, the campaign administration server awards said influencer a point amount corresponding to a point value assigned to said social media reaction;
wherein the point value assigned to a first social media reaction differs from the point value assigned to a second social media reaction based on the first social media reaction is performed on a first social media platform and the second social media reaction is performed on a second social media platform;
wherein, for each influencer participating in the campaign, said campaign administration server calculates a total point amount reflecting all point amounts awarded to said influencer during the campaign; and
wherein said campaign administration server supplies a reward to at least some of the plurality of influencers at the conclusion of the campaign based at least in part on the total point amount awarded to each of the plurality of influencers.

20. The system of claim 19, wherein, for each detection of one of said customer devices at a location associated with the campaign that is attributable to said influencer, said campaign administration server awards said influencer a point amount corresponding to the point value assigned to the detection of one of said customer devices at the location.

21. The system of claim 20, wherein the campaign administrator server provides a graphic identifier to each of the influencers participating in the campaign for inclusion in the social media posts associated with the campaign such that the graphic identifier is accessible by the customer devices, wherein the campaign administrator server detects when one of said customer devices is at a location associated with the campaign upon receiving data reflecting use of the graphic identifier at the location.

22. The system of claim 21, wherein the graphic identifier is a matrix barcode.

23. The system of claim 20, wherein said campaign administrator server detects when one of said customer devices is at a location associated with the campaign using a geolocation technology.

24. The system of claim 23, wherein said geolocation technology comprises the Global Positioning System.

25. The system of claim 19, wherein, for each purchase of a product or service associated with the campaign made by one of said customer devices that is attributable to said influencer, said campaign administration server awards said influencer a point amount corresponding to the point value assigned to said purchase.

26. The system of claim 19, wherein the campaign server publishes a current point amount for each influencer to the plurality of influencers during the campaign.

27. The system of claim 19, wherein said campaign administration server electronically transfers the reward to said influencers.

28. A system for conducting a social media marketing campaign, comprising:
a campaign administration server with a processor and program computer code for administering a campaign;
one or more social media servers, each social media server hosting a social media platform;
a plurality of influencer devices associated with a plurality of respective influencers participating in the campaign from which said campaign administration server receives identification information for each influencer participating in the campaign, and from which said one or more social media servers receive social media posts by the plurality of influencers associated with the campaign; and a plurality of customer devices associated with a plurality of customers from which said one or more social media servers receive social media reactions responsive to the social media posts associated with the campaign received from the influencer devices;

wherein, for each social media reaction by each customer that is attributable to each influencer, the campaign administration server awards said influencer a social media reaction point amount corresponding to a point value assigned to said social media reaction, wherein said social media reaction point amount is awarded independently of any other social media reaction and the location of said customer;

wherein, for each detection of one of said customer devices at a location associated with the campaign that is attributable to said influencer, said campaign administration server awards said influencer a customer location point amount corresponding to a point value assigned to the detection of one of said customer devices at the location, wherein said customer location point amount is awarded independently of any social media reactions at the location;

wherein the point value assigned to a first social media reaction differs from the point value assigned to a second social media reaction based on at least one of:

(a) the first social media reaction is performed on a first social media platform and the second social media reaction is performed on a second social media platform, and (b) the first and second social media reactions are different types of social media reactions;

wherein, for each influencer participating in the campaign, said campaign administration server calculates a ratio of (a) a total point amount reflecting the sum of all social media reaction point amounts and all customer location point amounts awarded to said influencer during the campaign, to (b) a total point amount reflecting all point amounts awarded to all influencers during the campaign; and wherein said campaign administration server supplies a cash or other reward to at least some of the influencers at the conclusion of the campaign based at least in part on the ratio calculated for said influencer.

29. The system of claim 28, wherein the campaign administrator determines a total reward amount for the campaign, and the reward supplied to each influencer is the total reward amount multiplied by the ratio.

30. The system of claim 28, wherein the campaign administrator server receives a total reward amount from a business sponsoring the campaign, and the reward supplied to each influencer is the total reward amount multiplied by the ratio.

* * * * *